United States Patent [19]

Ogawa

[11] Patent Number: 5,678,079
[45] Date of Patent: Oct. 14, 1997

[54] PHOTOMETER FOR A CAMERA

[75] Inventor: Hidehiro Ogawa, Funabashi, Japan

[73] Assignee: Niko Corporation, Tokyo, Japan

[21] Appl. No.: 493,247

[22] Filed: Jun. 22, 1995

[30] Foreign Application Priority Data

Sep. 7, 1994 [JP] Japan .................... 6-214037

[51] Int. Cl.$^6$ .............................. G03B 7/08; G03B 17/18
[52] U.S. Cl. .................................... 396/234; 396/290
[58] Field of Search .................... 354/429, 432,
354/476, 478, 425, 474, 472; 396/233,
234, 269, 271, 213, 290

[56] References Cited

U.S. PATENT DOCUMENTS

| | | | |
|---|---|---|---|
| 4,309,091 | 1/1982 | Fukuhara et al. | 354/31 |
| 4,448,506 | 5/1984 | Saegusa et al. | |
| 4,760,270 | 7/1988 | Miller | 250/563 |
| 5,146,258 | 9/1992 | Bell et al. | 354/432 |
| 5,479,237 | 12/1995 | Kitaoka | 354/474 |

Primary Examiner—Safet Metjahic
Assistant Examiner—Eric Nelson
Attorney, Agent, or Firm—Oliff & Berridge

[57] ABSTRACT

A photometer for a camera that performs multi-area photometry and displays the exposure deviation to the photographer. The photometer includes a light measuring device with a plurality of photometric elements that perform photometry at a plurality of areas within the photographic field. A photometric value determining section calculates an effective photometric value using a weighted addition of each photometric value according to the given photometric mode. A standard value determining section calculates a reference photometric value using a predetermined, specified weighted addition of each photometric value. A deviation determining section calculates the deviation in the logarithmic values of the effective photometric value and the reference photometric value. A display device displays the deviation calculated by the deviation determining section.

18 Claims, 5 Drawing Sheets

PHOTOMETER FOR A CAMERA

BACKGROUND OF THE INVENTION

1. Field of the Invention

The invention relates to a photometer for a camera for performing multi-area photometry and, in particular, to a photometer that displays the amount of exposure variation in multi-area photometry.

2. Description of Related Art

Generally, in conventional automatic exposure cameras, the brightness of the photographic subject is measured by a photometer. The exposure is automatically set according to the measured photometric value. In this type of photometer, complex exposure calculations are not necessary.

In recent years, photometers have been introduced that calculate an effective exposure of the brightness of the photographic subject. In this type of photometer, the photographic field is separated into a plurality of separately measured areas. A weighted addition of the measured values is performed using an internal controller to obtain a more precise exposure.

In a center area photometric mode, the effective exposure is calculated using a weighting emphasizing the measured photometric value at the center area of the photographic field. As a result, the brightness of the photographic subject located in the center of the photographic field is precisely calculated.

In an average photometric mode, the effective exposure is calculated using an average weighting of the measured photometric values for each area in the photographic field. As a result, the same brightness is calculated for the entire photographic field.

In a low brightness photometric mode, the effective exposure is calculated using a weighting emphasizing the measured photometric value with the lowest brightness. As a result, the brightness for a photographic subject located in a back-lighted or shaded area is precisely calculated.

In a high brightness photometric mode, the effective exposure is calculated using a weighting emphasizing the measured photometric value with the highest brightness. As a result, the brightness of the photographic subject located in a front-lighted or bright area is precisely calculated.

The calculated effective exposure, using one of the above-mentioned photometric modes, is adjusted according to the film sensitivity to properly expose the film. Then, the shutter speed and the diaphragm F-value are set according to the adjusted effective exposure.

In FIG. 6(A), a finder 1 displays the exposure information in a conventional manner. A shutter speed display component 4 displays the shutter speed and a diaphragm F-value display component 5 displays the diaphragm F-value. A focus adjustment mode display 3 displays the selected focus adjustment mode and a frame member display component displays the photometric frame member.

In FIG. 6(B), the exposure information when the exposure is manually adjusted is shown. An exposure deviation display component 6 displays a bar graph of the deviation between the manually adjusted exposure and the correct exposure. The photographer manually sets the correct exposure by adjusting the shutter speed and diaphragm F-value while referring to the bar graph display.

In FIG. 6(C), exposure information is shown when in the multi-area exposure mode. As seen in FIG. 6(C), the bar graph is not displayed on the exposure deviation display component 6. Instead, the shutter speed 4 and the diaphragm F-value 5 are displayed as the exposure information.

Thus, conventional photometers, the photographer cannot easily discern the exposure deviation while using the multi-area exposure mode. Further, the photographer cannot discern the exposure deviation using different exposure modes while using multi-area photometry.

SUMMARY OF THE INVENTION

It is an object of the invention to provide a photometer for a camera capable of displaying to the photographer the exposure deviation while using multi-area photometry.

In a preferred embodiment of the invention, a photometer includes a plurality of light measuring elements for performing photometry at a plurality of areas in the photographic field. Each light measuring element provides a photometric value. A photometric value determining section calculates an effective photometric value by performing a weighted addition according to a given photometric mode on each photometric value. A standard value determining section calculates a reference photometric value using a predetermined, specified weighted addition of each photometric value. A deviation determining section calculates a deviation in logarithmic values of the effective photometric value and the reference photometric value. A display device displays the deviation calculated by the deviation determining section.

These and other aspects and advantages of this invention are described or apparent from the following detailed description of the preferred embodiments.

BRIEF DESCRIPTION OF THE DRAWINGS

The preferred embodiments are described with reference to the drawings in which.

DETAILED DESCRIPTION OF PREFERRED EMBODIMENTS

Figure 1:
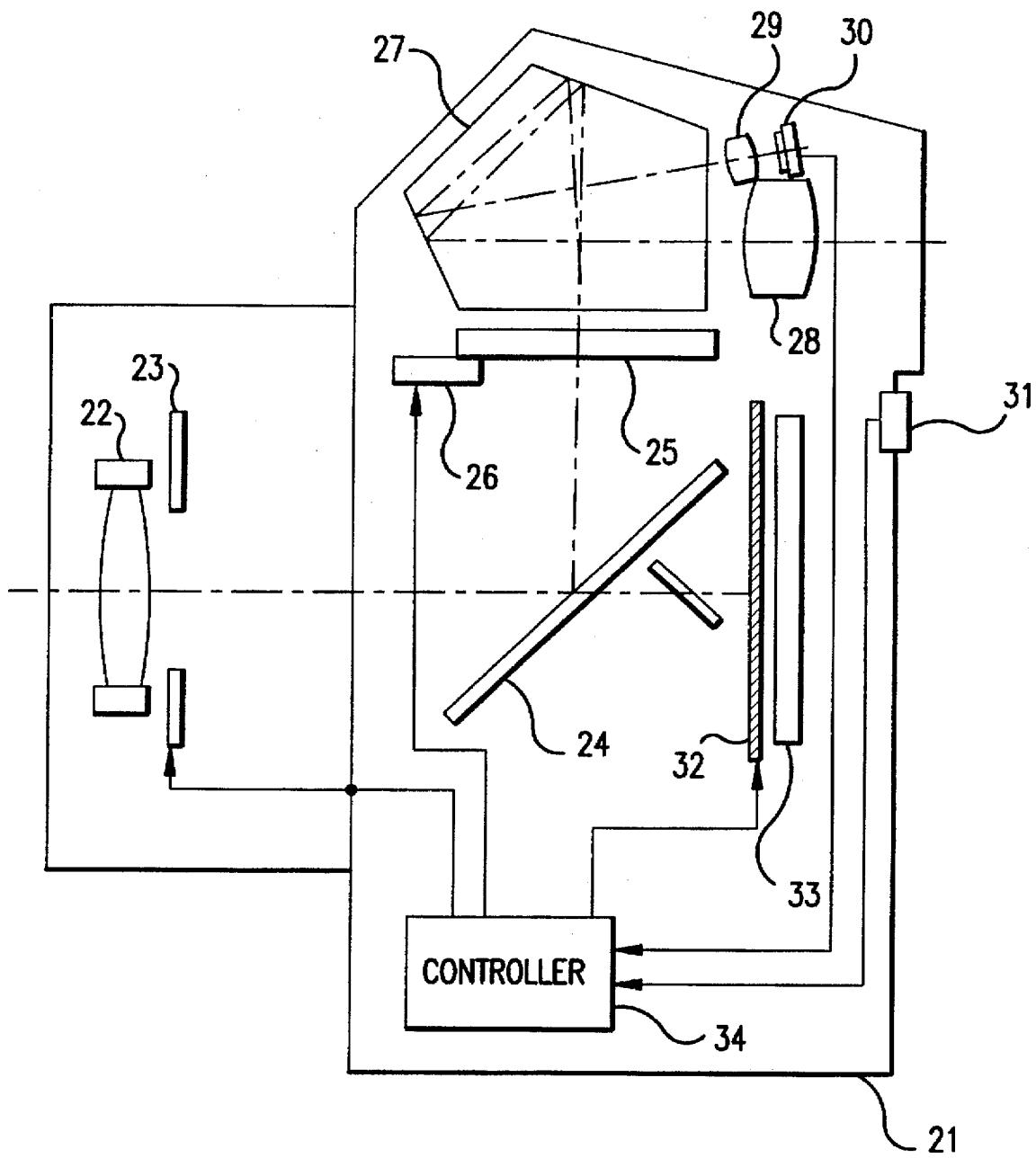
FIG. 1 is a function block diagram of the embodiment of the invention.

In FIG. 1, a photographic lens 22 is attached to the camera body 21. A diaphragm 23 and a mirror 24 are positioned on the optical axis of the photographic lens 22. A focusing screen 25 and a penta prism 27 are positioned in the direction in which the optical axis of the photographic lens 22 has been geometrically reflected with a regular reflection by the mirror 24. A display device 26 is provided parallel to the focusing screen 25.

An eyepiece lens 28 is positioned on the optical axis that has been reflected by the inside of the penta prism 27, and a photometric device 30 is arranged at a position near the penta prism 27 with a light collecting lens 29 positioned between the penta prism 27 and the photometric device 30.

In addition, to allow the selection of a photometric mode, a photometric mode selecting switch 31 is positioned in the camera body 21. A shutter 32 and film 33 are positioned behind the mirror 24.

The output from the photometric device 30 and switch 31 are input to the controller 34. The control outputs of the controller 34 are input to the diaphragm 23, the display device 26, and shutter 32.

The incident light that passes through the lens 22 is reflected by the mirror 24 and composed into an image of the subject on the focusing screen 25. The light that has passed the focusing screen 25 and dispersed is reflected by the inside of the penta prism 27 along with the radiated light from the display device 26 to be observed by the photographer through the eyepiece lens 28.

Part of the light that has been dispersed by the focusing screen 25 is received by the photometric device 30 through the penta prism 27 and the light collecting lens 29.

Figure 2:
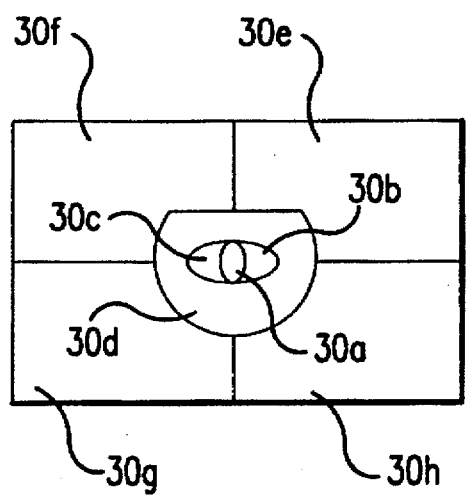
FIG. 2 is a drawing showing an example of a partitioned photometric pattern.

As shown in FIG. 2, the light receiving surface of the photometric device 30 is partitioned into eight photometric areas. A photometric element $30a, \ldots, 30h$ is provided for each photometric area, respectively.

Figure 3:
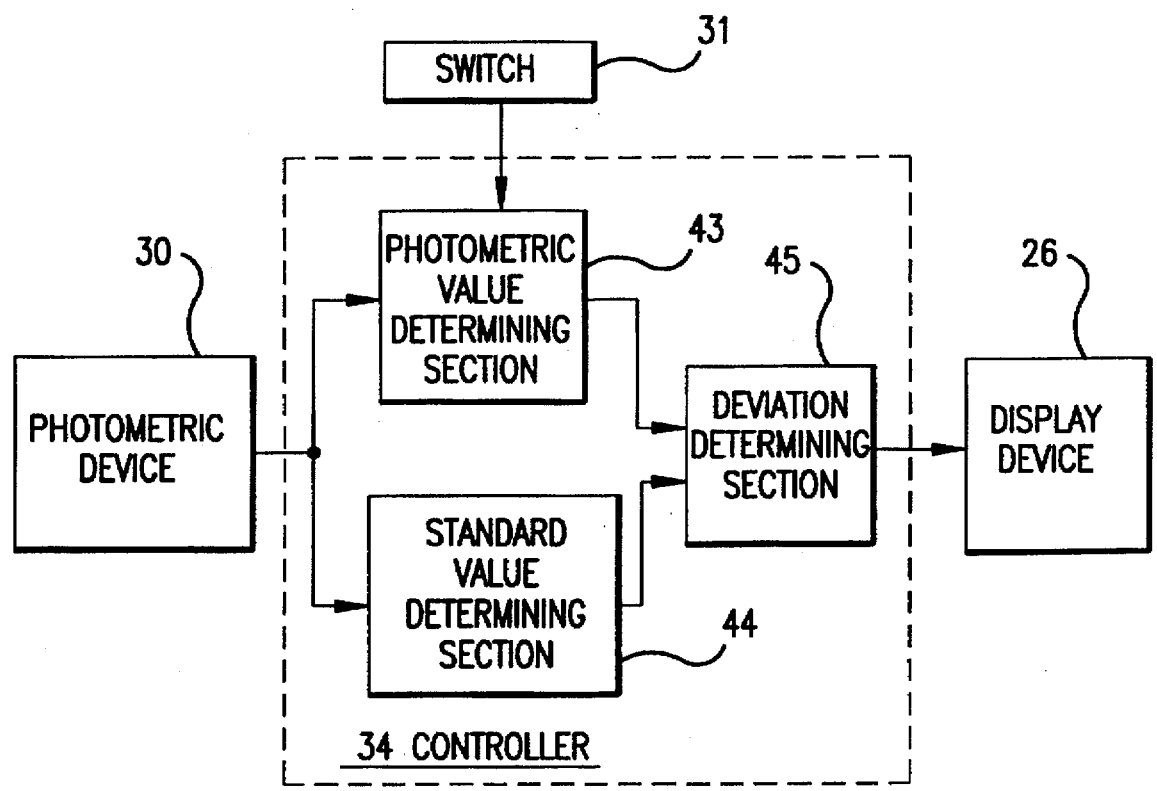
FIG. 3 is a block diagram of the controller of the invention.

As shown in FIG. 3, the controller 34 includes a photometric value determining section 43, a standard value determining section 44, and a deviation determining section 45.

In the invention, the controller 34 is implemented as a single special purpose integrated circuit (e.g., ASIC) having a main or central processor section for overall, system-level control, and separate sections dedicated to performing various different specific computations, functions and other processes under control of the central processor section.

It will be appreciated by those skilled in the art that the controller 34 can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like).

The controller 34 can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowchart shown in FIG. 4 can be used as the controller 34. As shown, a distributed processing architecture is preferred for maximum data/signal processing capability and speed.

The output from the photometric device 30 is input to the controller 34 and sent individually to the photometric value determining section 43 and the standard value determining section 44 of the controller 34.

The outputs of the photometric value determining section 43 and the standard value determining section 44 are input to the deviation determining section 45. The output of the deviation determining section 45 is input to the display device 26.

In the invention, the photometric value determining section 43 calculates an effective photometric value by performing a weighted addition of each photometric value from the partitioned photometric areas in the photographic field. The weighted addition is performed according to the photometric mode selected by photometric mode selecting switch 31.

The standard value determining section 44 calculates a reference photometric value by performing a predetermined, specified weighting addition of each photometric value from the partitioned photometric areas in the photographic field.

The deviation determining section 45 calculates a logarithmic deviation using the effective Photometric value and the reference photometric value.

Generally, the proper exposure value Ev can be expressed according to the following Equation (1):

$$Ev = \log (B*S/K) \tag{1}$$

where:
B is the photometric value of the photographic subject;
S is the film sensitivity; and
K is a Proportional constant.

Using Equation (1), the deviation between the exposure value Ev' calculated by using the effective photometric value B', and the exposure value Ev" calculated by using the reference photometric value B", can be expressed according to following Equation (2):

$$Ev' - Ev'' = \log (B') - \log (B'') \tag{2}$$

where:
B' is the effective photometric value; and
B" is the reference photometric value.

Therefore, by calculating the deviation in the logarithmic values of the effective photometric value B' and the reference photometric value B", the deviation determining section 45 calculates a value corresponding to the deviation between the exposure values Ev' and Ev".

The display device 26 is used to display the exposure deviation and the film frame numbers. The exposure deviation is a real number with a decimal point in the range of ±2.0. Since the film frame number is an integer, the photographer can easily distinguish between the frame number and the exposure deviation.

Figure 4:
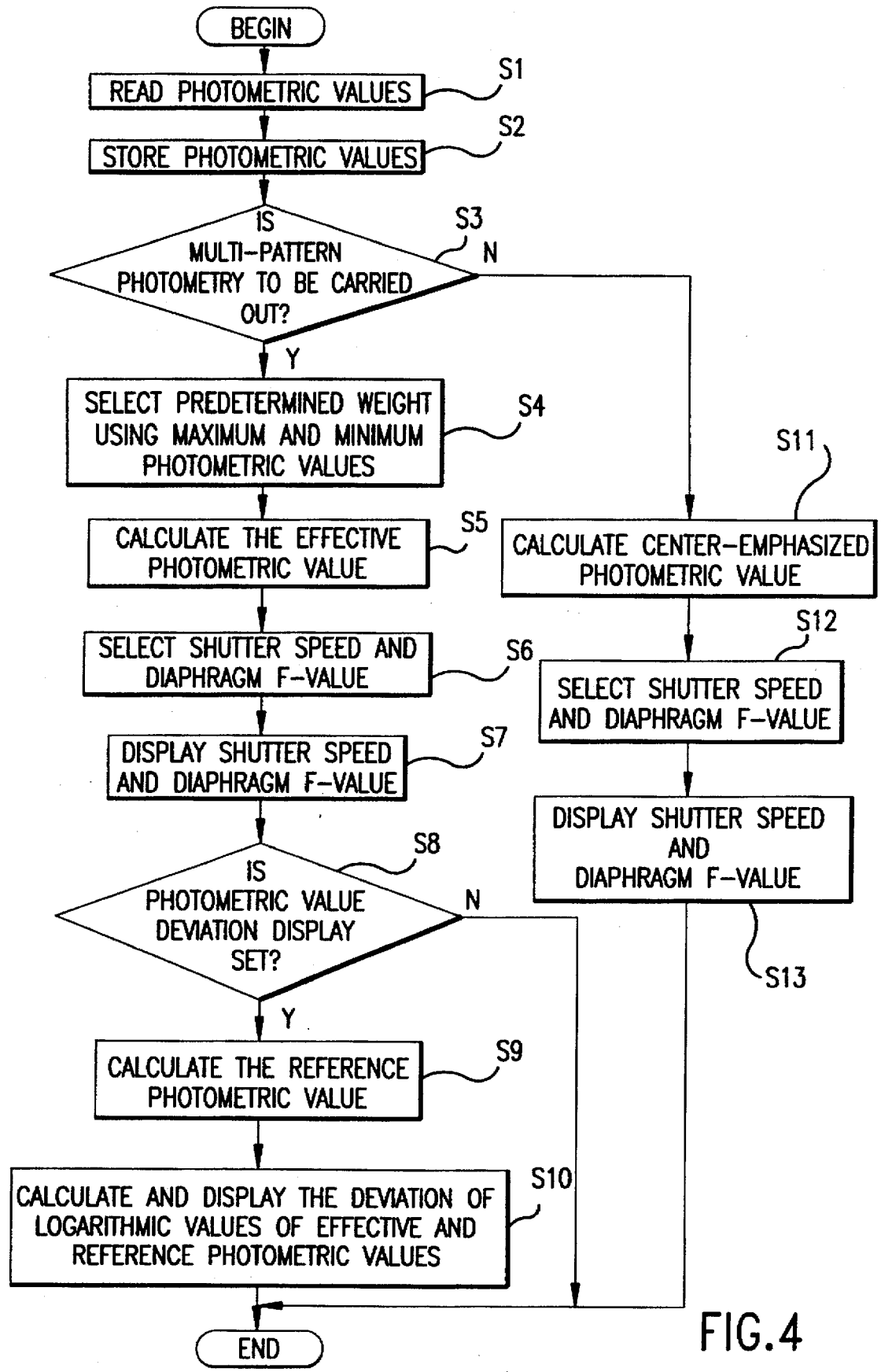
FIG. 4 is a flowchart showing the operation of the invention.

FIG. 4 shows a flowchart of the operation of this invention. When the release button (not shown) is depressed halfway, the controller 34 reads the photometric value of each of the photometric elements $30a, \ldots, 30h$ (step S1) and stores the photometric values in an internal memory (step S2).

When the multi-area photometric mode has been selected using the switch 31 (step S3), the controller 34 determines the contrast ratio of the photographic field using the maximum and minimum photometric values. From the maximum and minimum photometric values, controller 34 also determines whether the environment is indoors or outdoors. One of the predetermined weights is then selected using the maximum and minimum photometric values.

The photometric value determining section 43 calculates the effective photometric value by weighting and adding the photometric values according to predetermined, selected weights (step S5).

The proper combination of shutter speed and diaphragm F-value are selected (step S6) according to the effective exposure value and the film sensitivity. Then, the shutter speed and diaphragm F-value are displayed on the display device 26 (step S7).

At this point, if the photometric value deviation display has been set as the initial setting (step S8), the controller 34 performs a weighted addition emphasizing the photometric value in the center of the photographic field. The standard value determining section 44 calculates the center-emphasized photometric value as the reference photometric value (step S9).

The deviation determining section 45 calculates the deviation of the logarithmic values of the effective photometric value and the reference photometric value which corresponds to the deviation of the exposure values according to equation (2).

Figure 5A:
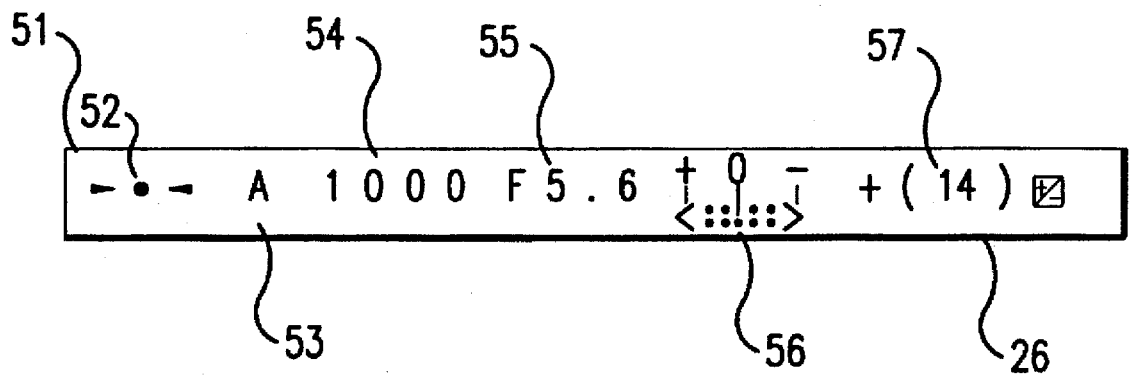
FIGS. 5(A)–5(C) are drawings showing the display components of the invention.

In FIG. 5(A), a finder 51 displays the exposure information. A shutter speed display component 54 displays the shutter speed and a diaphragm F-value display component 55 displays the diaphragm F-value. A focus adjustment mode display 53 displays the selected focus adjustment mode and a frame member display component 57 displays the photometric frame member.

Figure 5B:
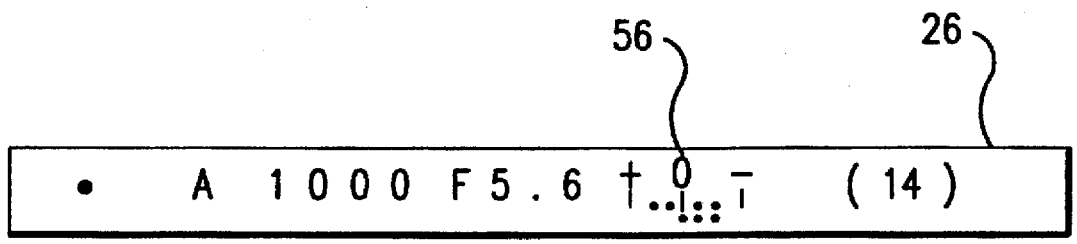

As shown in FIG. 5(B), the deviation is displayed, on a liquid crystal display 52, and on the exposure deviation display component 56 of the display device 26 (step S10). In FIG. 5(B), gradations of the bar graph display are provided at every ⅓ level on the exposure deviation display component 56. Thus, the exposure deviation using multi-area photometry is shown to be substantially at the −0.7 (rounded from −0.666. . .) level.

If multi-area photometry is not performed (step S3), a weighted addition which emphasizes the photometric value at the center area of the photographic field is performed and a center-emphasized photometric value is calculated (step 11).

A shutter speed and diaphragm F-value is selected based on the center-emphasized photometric value and film sensitivity (step S12). Then, the shutter speed and diaphragm F-value are displayed on the display device 26 (step S13).

Since the display device 26 can also use the exposure deviation display component 56, it is not necessary to provide a separate display. Thus, the number of display components do not increase and the display can be easily read by the photographer.

It should be understood that a center-emphasized photometric value calculated as the reference photometric value does not limit this invention. For example, an average of all the photometric values in the field (average photometric value) can also be calculated as the reference photometric value. Since the average photometric value is a standard value indicating the brightness of the photographic range, the exposure determination can be accurately and easily performed by using the average photometric value as the reference photometric value.

Figure 5C:
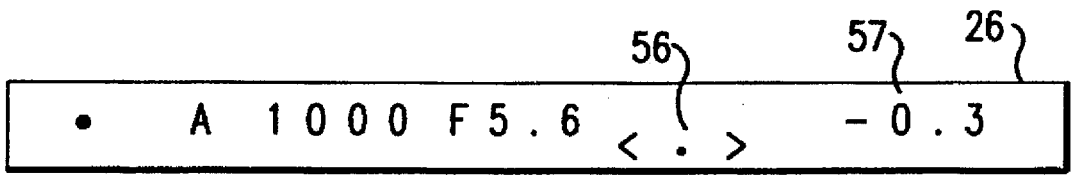
Figures 6A, 6B, 6C:
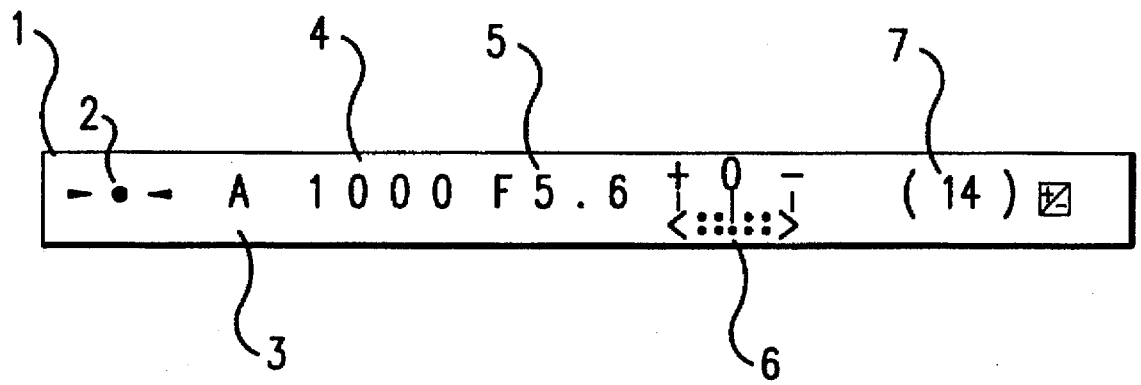
FIGS. 6(A)–6(C) are drawings showing the display components in a conventional finder.

It should also be understood that the frame number display component 57 can be used for more than one purpose and does not limit this invention. For example, the photographic frame number may be ordinarily displayed on the frame number display component 57. However, as shown in FIG. 5(C), when the release switch is depressed halfway, the exposure variation amount may also be displayed on the frame number display component 57. Thus, the frame number display component 57 can be used for more than one purpose. As a result, more display components are unnecessary and the display can be easily read by the photographer.

Furthermore, when the exposure deviation is displayed on the frame number display component 57, a photometric deviation display symbol can be displayed on the exposure deviation display component 56. By displaying this type of symbol, the frame number and exposure deviation can be easily distinguished by the photographer.

A standard photometric value emphasizes the center of the field (a center-emphasized photometric value) is used as the reference photometric value. Thus, the exposure deviation obtained through multi-area photometry can be accurately calculated. As a result, the photographer can accurately determine whether the exposure obtained using multi-area photometry is correct.

A standard photometric value is an average of all the photometric values in the field (an average photometric value) is used as the reference photometric value. Thus, the exposure deviation obtained through multi-area photometry can be accurately calculated. As a result, the photographer can accurately determine whether the exposure obtained using multi-area photometry is correct.

The deviation is displayed only when multi-area photometry is selected. Thus, unnecessary information is not displayed in other photometric modes allowing the display to be easily read by the photographer.

The display means uses the display device 26 of the exposure correction amount for manual exposure and for film frame numbers. Thus, the exposure deviation obtained through multi-area photometry can be displayed without changing the workings of the display component. In addition, since the number of display components do not increase, the displayed information does not become complex allowing the display to be easily read by the photographer.

Furthermore, the exposure correction amount obtained through manual exposure and the exposure deviation obtained through multi-area photometry are both displayed using the units of the exposure value (Ev). Thus, the display can use the same scale.

As described above, using the photometer of this invention, the photographer can easily discern whether the exposure obtained through multi-area photometry is correct. Thus, exposure mistakes are decreased and the resultant photograph more accurately reflects the intentions of the photographer.

While the invention has been described in conjunction with specific embodiments, it is evident that many alternatives, modifications and variations will be apparent to those skilled in the art. Accordingly, the preferred embodiment of the invention as set forth herein is intended to be illustrative, rather than limiting. Various changes may be made without departing from the spirit and scope of this invention as defined in the following claims.

What is claimed is:

1. A photometer for a camera, comprising:

photometric means including a plurality of photometric elements for performing photometry in a plurality of areas within a photographic field, each photometric element providing a photometric value;

photometric value determining means for calculating an effective photometric value using a weighted addition of each photometric value from said photometric means within the photographic field according to a given photometric mode;

standard value determining means for calculating a reference photometric value using a predetermined, specified weighted addition of each photometric value from said photometric means within the photographic field;

deviation determining means for calculating a logarithmic deviation of the effective photometric value from said photometric value determining means and the reference photometric value from said standard value determining means; and display means for displaying the logarithmic deviation calculated by said deviation determining means.

2. The photometer according to claim 1, wherein the predetermined, specified weight used by said standard value determining means is a photometric value in a center area of the photographic field.

3. The photometer according to claim 1, wherein the predetermined, specified weight used by said standard value determining means is an average value of each photometric value.

4. The photometer according to claim 1, wherein said display means displays the logarithmic deviation calculated by said deviation determining means when the multi-area photometric mode is a selected photometric mode, and wherein said display means does not display the logarithmic deviation calculated by said deviation determining means when the multi-area photometric mode is not a selected photometric mode.

5. The photometer according to claim 1, wherein said display means comprises a display component that displays an exposure correction amount when a manual exposure mode is selected.

6. The photometer according to claim 1, wherein said display means comprises a display component that displays film frame numbers.

7. A photometer for a camera, comprising:
   a photometric device including a plurality of photometric elements for performing photometry in a plurality of areas within a photographic field, each photometric element providing a photometric value;
   a photometric value determining section for calculating an effective photometric value using a weighted addition of each photometric value from said photometric device within the photographic field according to a given photometric mode;
   a standard value determining section for calculating a reference photometric value using a predetermined, specified weighted addition of each photometric value from said photometric device within the photographic field;
   a deviation determining section for calculating a logarithmic deviation of the effective photometric value from said photometric value determining section and the reference photometric value from said standard value determining section; and
   a display device for displaying the logarithmic deviation calculated by said deviation determining means.

8. The photometer according to claim 7, wherein the predetermined, specified weight used by said standard value determining section is a photometric value in a center area of the photographic field.

9. The photometer according to claim 7, wherein the predetermined, specified weight used by said standard value determining section is an average value of each photometric value.

10. The photometer according to claim 7, wherein said display device displays the logarithmic deviation calculated by said deviation determining section when the multi-area photometric mode is a selected photometric mode, and wherein said display device does not display the logarithmic deviation calculated by said deviation determining section when the multi-area photometric mode is not a selected photometric mode.

11. The photometer according to claim 7, wherein said display device comprises a display component that displays an exposure correction amount when a manual exposure mode is selected.

12. The photometer according to claim 7, wherein said display device comprises a display component that displays film frame numbers.

13. A method for displaying an exposure deviation in a camera while using multi-area photometry, comprising the steps of:
   reading photometric values from a plurality of photometric elements at a plurality of areas within a photographic field;
   determining an effective photometric value using a weighted addition of each photometric value within the photographic field according to a given photometric mode;
   determining a reference photometric value using a predetermined, specified weighted addition of each photometric value within the photographic field;
   determining a logarithmic deviation of the effective photometric value and the reference photometric value; and
   displaying the logarithmic deviation.

14. The method according to claim 13, wherein said effective photometric value determining step uses a predetermined, specified weight that is a photometric value in a center area of the photographic field.

15. The method according to claim 13, wherein said reference photometric value determining step uses a predetermined, specified weight that is an average value of each photometric value.

16. The method according to claim 13, wherein said display step displays the logarithmic deviation when the multi-area photometric mode is a selected photometric mode, and said display step does not display the logarithmic deviation when the multi-area photometric mode is not a selected photometric mode.

17. The method according to claim 13, wherein said display step displays an exposure correction amount when a manual exposure mode is selected.

18. The method according to claim 13, wherein the display step displays film frame numbers.

* * * * *